US007637201B2

(12) United States Patent
Lin

(10) Patent No.: US 7,637,201 B2
(45) Date of Patent: Dec. 29, 2009

(54) ADJUSTABLE HYDRAULIC SUPPORT CYLINDER

(75) Inventor: Yhu-Tin Lin, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 430 days.

(21) Appl. No.: 11/736,165

(22) Filed: Apr. 17, 2007

(65) Prior Publication Data

US 2007/0289437 A1 Dec. 20, 2007

Related U.S. Application Data

(60) Provisional application No. 60/814,110, filed on Jun. 16, 2006.

(51) Int. Cl.
*F15B 11/08* (2006.01)
*F16D 31/02* (2006.01)
*F16M 11/00* (2006.01)

(52) U.S. Cl. ........................................ 91/437; 60/413

(58) Field of Classification Search .................. 60/413, 60/481; 91/45, 437; 248/161, 415, 631
See application file for complete search history.

(56) References Cited

U.S. PATENT DOCUMENTS 3,359,802 A 12/1967 Sollenberger
4,074,887 A 2/1978 Hale
4,257,582 A 3/1981 Wirges
6,056,251 A 5/2000 Knopp
6,336,624 B1 1/2002 Kulhavy
6,644,637 B1 11/2003 Shen et al. .................. 269/152

*Primary Examiner*—Michael Leslie

(57) ABSTRACT

An adjustable length cylinder assembly includes a housing and a piston reciprocably mounted within the housing for movement between an extended position and a retracted position. The piston defines first and second hydraulic fluid chambers of differing cross-sectional area on opposite sides of the piston. An accumulator is housed within one of the housing and the piston. Channels communicate hydraulic fluid the first and second chambers and the accumulator during the movement of the piston. A valve member is concentric with the piston and accumulator and rotatable between a first rotary position in which the channels are open so that fluid can be transferred between the chambers to allow retracting and extending movement of the piston and a second rotary position in which the channels are closed so that fluid cannot be transferred and the piston is locked against retracting and extending movement.

19 Claims, 3 Drawing Sheets

ADJUSTABLE HYDRAULIC SUPPORT CYLINDER

This application claims priority from provisional patent application Ser. No. 60/814,1101 filed Jun. 16, 2006.

FIELD OF THE INVENTION

A hydraulic support has self-contained hydraulic chambers and a fluid accumulator chamber that are selectively connected by an internal rotary valve.

BACKGROUND OF THE INVENTION

It is often desirable in the manufacturing industries to utilize an adjustable support for supporting a workpiece or the like. Hydraulic supports, typically an oil filled hydraulic cylinder can be used as such an adjustable support. The height of the adjustable support cylinder is locked by trapping a volume of hydraulic fluid inside the hydraulic cylinder and the height can be adjusted by adding or removing fluid from the hydraulic cylinder. An example of a workholding device uses adjustable length hydraulic cylinders.

It would be desirable to provide improvements in such hydraulic supports, so that the support could be relatively compact and self-contained, and adjustable in length without exterior valving, pumps, reservoirs or the like.

SUMMARY OF THE INVENTION

A length-adjustable cylinder assembly includes a housing and a piston reciprocably mounted within the housing for movement between an extended position and a retracted position. The piston defines first and second hydraulic fluid chambers of differing cross-sectional area on opposite sides of the piston. An accumulator is housed within either the housing or the piston. Channels communicate hydraulic fluid between the first and second chambers and the accumulator during the movement of the piston. A valve member is concentric with the piston and accumulator and rotatable between a first rotary position in which the channels are open so that fluid can be transferred between the chambers to allow retracting and extending movement of the piston and a second rotary position in which the channels are closed so that fluid cannot be transferred and the piston is locked against retracting and extending movement.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

Figure 1:
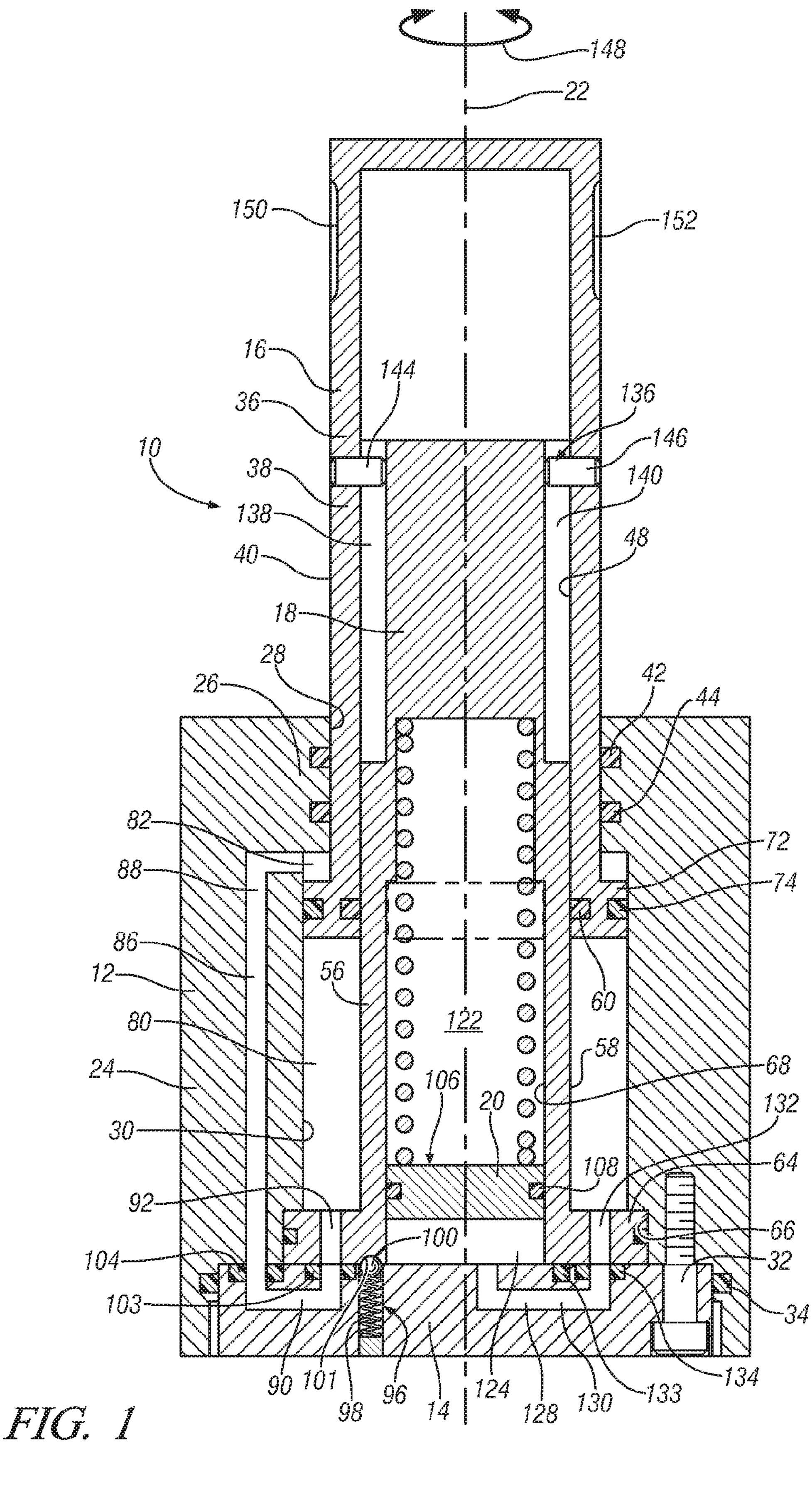
FIG. 1 is a side elevation view of a hydraulic support cylinder shown in the unlocked position enabling height wise adjustment.

Referring to FIG. 1, a hydraulic cylinder assembly, generally indicated at 10, includes an outer housing 12, a base 14, a piston 16, a rotary valve member 18, and an accumulator piston 20 that are concentric about a central axis 22.

The outer housing 12 is cylindrical in shape and includes a cylindrical side wall 24 and an upper end wall 26 having a central aperture 28. The cylindrical side wall 24 of the outer housing 12 has an inner bore 30 and also an open bottom that is closed by the base 14 which is attached to the side wall 24 by a plurality of bolts, one of which is shown at 32. A seal 34 is seated between the outer housing 12 and its base 14 to prevent leakage of hydraulic fluid.

The piston 16 is of hollow cylindrical shape and includes a rod 36 having a side wall 38 with an outer surface 40 that slides in the aperture 28 of the upper end wall 26 of the outer housing 12. Seals 42 and 44 are seated between the piston outer surface 40 and the aperture 28 of outer housing 12 to prevent leakage of hydraulic fluid. The piston 16 is hollow and has an inner bore 48 for receiving the rotary valve member 18, as will be discussed hereinafter. The upper end of the piston rod 36 will be engaged by a workpiece or other element that will be supported by the hydraulic support cylinder 10.

The rotary valve member 18 is of hollow cylindrical shape and has an outer cylindrical side wall 56 with an outer surface 58 that slidably engages the inner bore 48 of the piston 16. A seal 60 is mounted on the inner bore 48 of the piston 16 and engages the outer surface 58. The rotary valve member 18 includes a flange 64 at the lower end of the side wall 56. This flange 64 is rotatably captured between the base 14 and a recess 66 formed in the side wall 24 of the outer housing 12 so that the rotary valve member 18 may rotate about the central axis designated 22. The rotary valve member 18 is hollow and has an inner bore 68.

The piston 16 has a flange 72 at the lower end of the side wail 38 of the piston 16. The flange 72 carries a seal 74 that engages the inner bore 30 of the outer housing side wall 24. As seen in FIG. 1, the flange 72 divides the hollow interior space between the outer surface 58 of the rotary valve member 18 and the inner bore 30 of the outer housing side wall 24 into a lower chamber 80 and an upper chamber 82. The upper chamber 82 has a smaller cross-sectional area than the lower chamber 80.

As seen in FIG. 1, the upper chamber 82 and the lower chamber 80 are connected together by a channel 86 that includes a bore 88 in the outer housing side wall 24, a bore 90 in the base 14, and a valve port 92 in the flange 64 of the rotary valve member 18. A ball detent assembly, generally indicated at 96, including a spring 98, ball 100, and recess 101 establishes the rotary valve member 18 in the normal rotary position of FIG. 1, where the channel 86 is open and the piston 16 can move up and down between extended and retracted positions by transferring hydraulic fluid between the upper chamber 82 and the lower chamber 80. Seals 103 and 104 are provided between the base 14 and the piston flange 64 of the rotary valve member 18 to prevent leakage around the bore 90.

Because of the differential cross-sectional area of the upper chamber and the lower chamber, an accumulator, generally indicated at 106, is provided to store hydraulic fluid The accumulator 106 includes the accumulator piston 20 that is slidable within the inner bore 68 of the rotary valve member 18 and carries a seal 108. The accumulator piston 20 divides the hollow interior of the rotary valve member 18 into a spring chamber 122 and a fluid storage chamber 124. Spring 126 is located in the spring chamber 122 and urges the accumulator piston 20 downwardly. The fluid storage chamber 124 is connected to the lower chamber 80 by a channel 128 that includes a bore 130 in the base 14 and a valve port 132 provided in the piston flange 64. Accordingly, as the piston 16 moves up and down, hydraulic fluid can transfer through the channel 128 between the accumulator chamber 124 and the lower chamber 80 and through the channel 86 to the upper chamber 82. Seals 133 and 134 are provided between the base 14 and the outer housing 12 to prevent leakage around the bore 128.

The rotary valve member 18 can be rotated within the outer housing 12 by a splined connection, generally indicated at 136, that acts between the piston 16 and the valve member 18. The splined connection 136 includes a pair of keyway slots 138 and 140 that are provided in the outer surface 58 of the rotary valve member 18 and a pair of key pins 144 and 146 that are carried by the piston 16 and project into the keyway slots 138 and 140. Thus, when the piston 16 is gripped and rotated in the direction of arrows 148, the rotary valve member 18 will be rotated in unison with the piston 16. As seen in FIG. 1, flat surfaces 150 and 152 are provided on the outer surface of the piston 16 to facilitate gripping the piston 16 with either a wrench or a robotic hand. When the piston 16 is moved up and down, the key pins 144 and 146 will slide in the keyway slots 138 and 140 while the rotary valve member 18 retains its rotary position established by the ball detent assembly 96.

In operation, FIG. 1, the piston 16 can be moved up and down. Fluid is displaced between upper chamber 82 and Lower chamber 80 via channel 86, and fluid can be transferred to and from the fluid storage chamber 124 and the lower chamber 80 via the channel 128.

Figure 2:
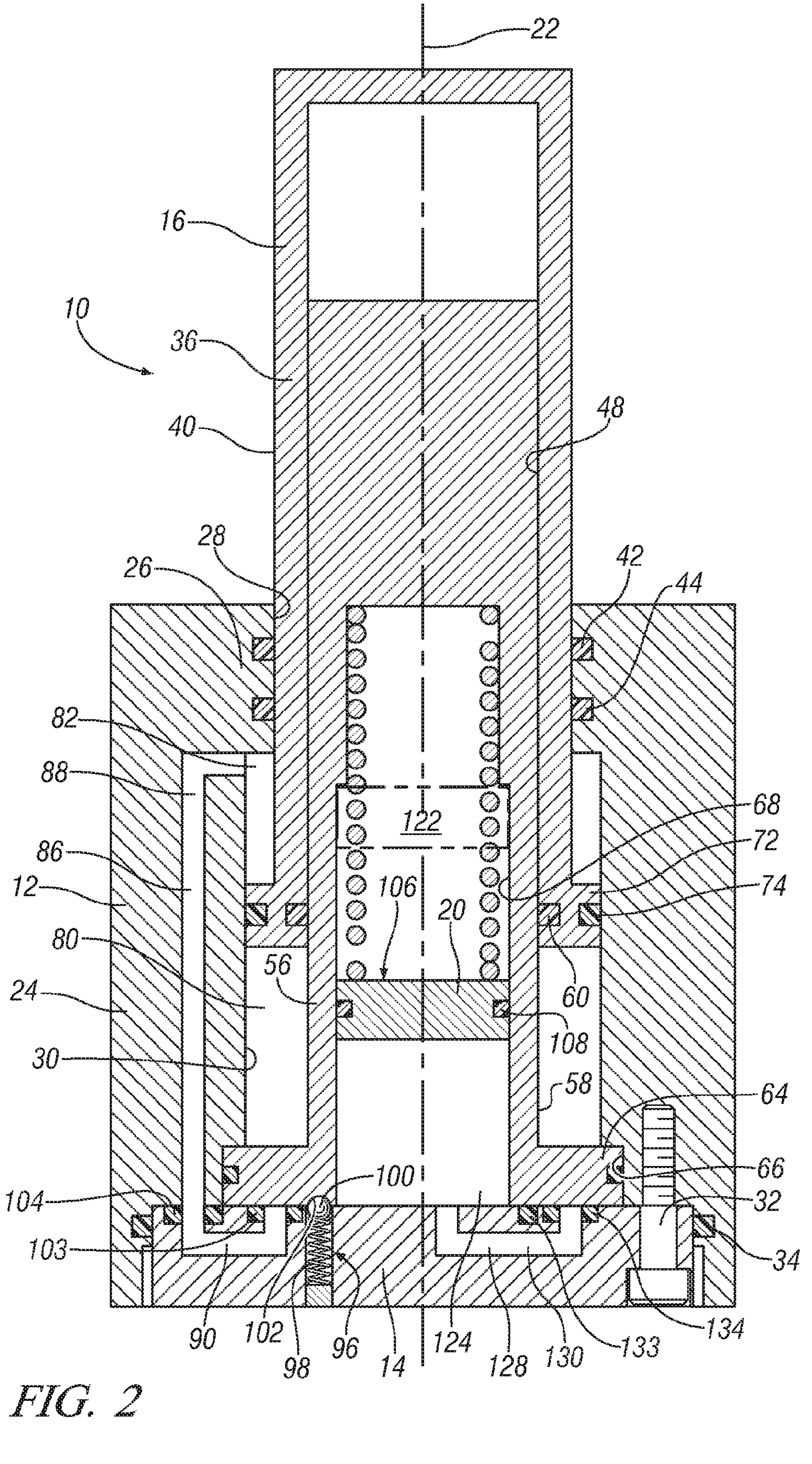
FIG. 2 is a view similar to FIG. 1 but showing the hydraulic support cylinder in the locked position in which the piston cannot move.

Referring to FIG. 2, it is seen that the piston 16 and the rotary valve member 18 have been rotated from the positions of FIG. 1, and the ball 100 of ball detent assembly 96 has become lodged in a recess 102 provided on the underside of the rotary valve member 18. By rotating the rotary valve member 18 to the position of FIG. 2, the valve ports 92 and 130 shown in FIG. 1 have been rotated away from alignment with the bores 90 and 130 provided in the base 14. As a result, fluid communication is shut off between the upper chamber 82, lower chamber 80 and fluid storage chamber 124. Accordingly, if a force is applied to move the piston 16 in the downward direction, the hydraulic fluid captured in the lower chamber 80 will support the piston 16 against movement, and if a force is applied to move the piston 16 in the upward direction the hydraulic fluid captured in the upper chamber 82 will support the piston 16 against movement. Thus the hydraulic cylinder 10 will function as a locked and fixed length support. If, thereafter, it is desired to adjust the position of the piston 16 either up or down, the piston 16 is gripped and rotated back to the rotary position of FIG. 1 where fluid flow is re-established between the upper chamber 82, lower chamber 80 and fluid storage chamber 124, so that the hydraulic cylinder 10 is then unlocked for lengthwise adjustment.

Figure 3:
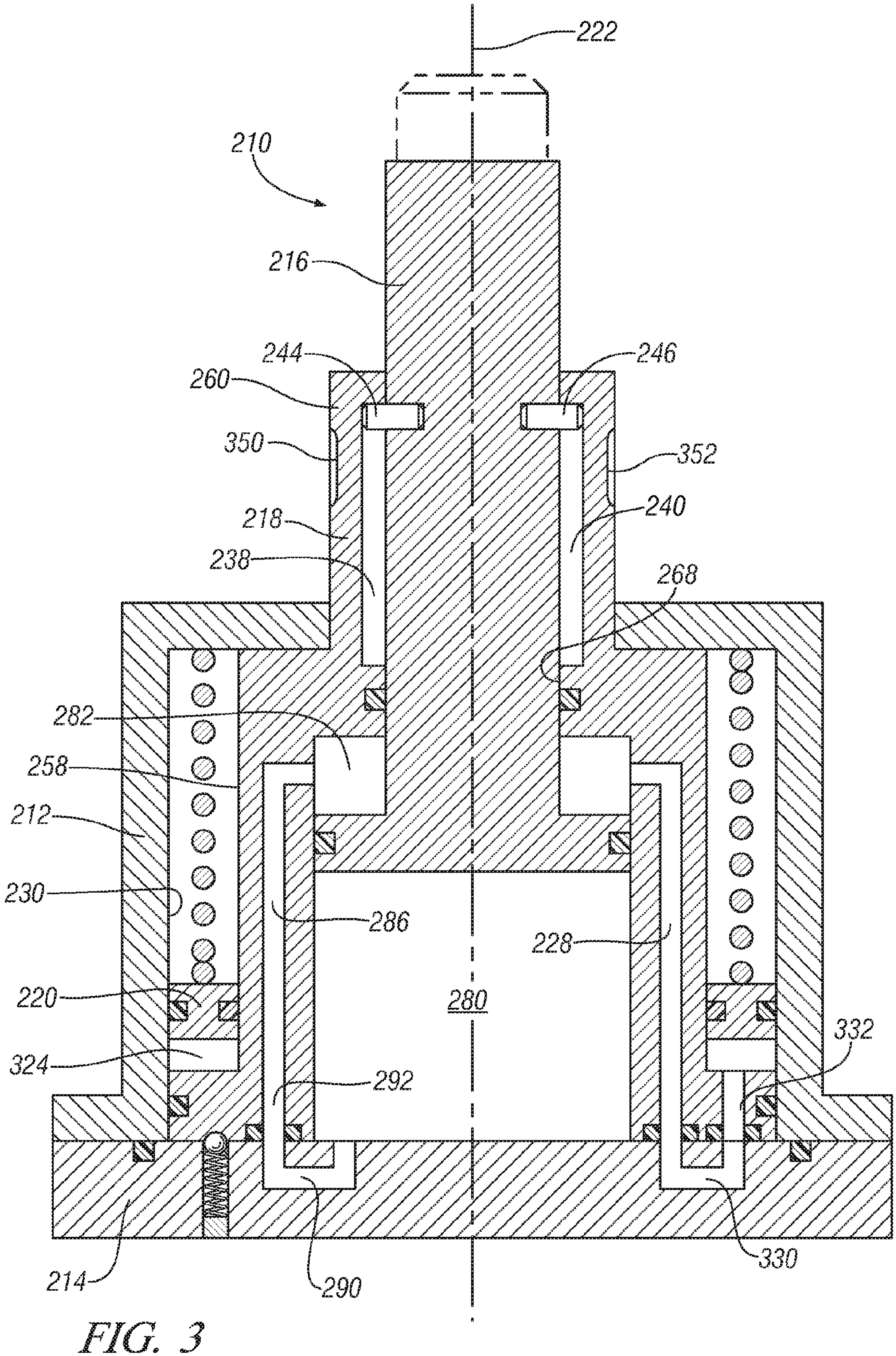
FIG. 3 is a side elevation view of a second embodiment of the invention.

FIG. 3 shows another embodiment of the invention, which operates in the same manner as the embodiment of FIGS. 1 and 2, however the accumulator is located outboard of the rotary valve in a space between the outer housing and the rotary valve member rather than being located inboard of the rotary valve and inside the piston as shown in FIG. 1. In particular, FIG. 3 shows a hydraulic cylinder assembly, generally indicated at 210, including an outer housing 212, a base 214, a piston 216, a rotary valve member 218, and an accumulator piston 220 that are each concentric about a central axis 222.

In the embodiment of FIG. 3, the outer housing 212 has an inner bore 230 and the rotary valve member 218 has an outer surface 258 that are spaced from one another. The accumulator piston 220 is a ring shaped piston that slides on the inner bore 230 and the outer surface 258.

Furthermore in the embodiment of FIG. 3, keyway slots 238 and 240 are provided an the inner bore 268 of the rotary valve member 218 and keyway pins 244 and 246 are carried by the piston 216 and project into the keyway slots 238 and 240 of the rotary valve member 218. Also, as seen in FIG. 3, the rotary valve member 218 has an upper extension portion 260 that reaches upwardly out of the outer housing 212 and has flat surfaces 350 and 352 by which the rotary valve member 218 can be gripped by a wrench or a robotic hand in order to rotate the rotary valve member 218.

In operation, similar to FIG. 1, the piston 216 can be moved up and down. Fluid is displaced between an upper chamber 282 and a lower chamber 280 via a channel 286 in the rotary valve member 218 and a channel 290 in the base 214. Fluid can also be transferred to and from the fluid storage chamber 324 and the upper chamber 282 via a channel 228 in the rotary valve member 218 and a channel 330 in the base 214. Thus hydraulic fluid can transfer between the upper chamber 282 and the lower chamber 280 and the accumulator chamber 324 as needed to enable the up and down length-wise adjustment of the piston 216.

When it is desired to fix the length of the hydraulic cylinder 210, the piston 216 and the rotary valve member 218 can be rotated from their positions of FIG. 3 so that valve ports 292 and 332 shown in FIG. 3 will be rotated away from alignment with the channels 290 and 330 provided in the base 214. As a result fluid communication is shut off between the upper chamber 282, lower chamber 280 and accumulator chamber 324. Accordingly if a force is applied to move the piston 216 upwardly or downwardly, the hydraulic fluid captured in the upper chamber 282 and the lower chamber 280 will support the piston 216 against movement and thus the hydraulic cylinder 210 is locked and will function as a fixed length support. If, thereafter, it is desired to adjust the position of the piston 216 either up or down, the piston 216 is gripped and rotated back to the rotary position of FIG. 3 where fluid flow is re-established between the upper chamber 282, lower chamber 280, and accumulator chamber 324. Alternatively, the piston 216 can be gripped and rotated, in which case the spline connection provided by the keyway slots 238 and 240 and the key pins 244 and 246 will cause the valve member 218 to be rotated.

If desired, the splined connection provided by the keyway slots 238 and 240 and the key pins 244 and 246 can be omitted from the embodiment of FIG. 3, in which event the piston rod 216 may or may not rotate when the rotary valve 218 rotates, depending upon the friction and between the rotary valve member 218 and piston 216, as well as the viscosity of the hydraulic fluid in the upper chamber 282 and lower chamber 280.

What is claimed is:

1. An adjustable length cylinder comprising:

a cylinder housing;

a piston slidable in the cylinder housing to define hydraulic fluid chambers on opposite sides of the piston and having a rod extending out of the cylinder housing;

a first channel for communicating hydraulic fluid between the hydraulic chambers;

an accumulator housed within the housing to store or supply excess hydraulic fluid during movement of the piston;

a second channel for communicating hydraulic fluid to the accumulator;

and a rotary valve responsive to rotation of the piston to selectively open and close the first and second channels so that the piston is either permitted to extend and retract or is hydraulically locked against extension and retraction.

2. The adjustable length cylinder assembly of claim 1 further comprising said rotary valve having a first port for opening and closing the first channel and second port for opening and closing the second channel.

3. The adjustable length cylinder assembly of claim 1 further comprising said piston and rotary valve and accumulator each being of cylindrical shape and concentrically arranged within the confines of the housing.

4. The adjustable length cylinder assembly of claim 1 comprising a splined connection acting between the piston and the rotary valve so that when one of the piston and rotary valve is rotated the other will also rotate.

5. An adjustable length cylinder assembly comprising:

a housing;

a piston reciprocably mounted within the housing for movement between an extended position and a retracted position and defining first and second hydraulic fluid chambers of differing cross-sectional area on opposite sides of the piston;

an accumulator housed within one of the housing and the piston for storing and supply hydraulic fluid;

channels for communicating fluid between the first and second chambers and the accumulator during the movement of the piston;

a valve member concentric with the piston and accumulator and rotatable between a first rotary position in which the channels are open so that fluid can be transferred between the chambers to allow retracting and extending movement of the piston and a second rotary position in which the channels are closed so that fluid cannot be transferred and the piston is locked against retracting and extending movement.

6. The adjustable length cylinder assembly of claim 5 further comprising said accumulator having an accumulator chamber, a spring and a piston that are housed within the rotary valve.

7. The adjustable length cylinder assembly of claim 5 further comprising said accumulator having an accumulator chamber, a spring and a piston that are housed within the housing and outboard of the rotary valve.

8. The adjustable length cylinder assembly of claim 5 further comprising said piston being hollow and the valve member being located inboard of the piston, and a splined connection acting between the piston and the valve member so that rotation of the piston will rotate the rotary valve.

9. The adjustable length cylinder assembly of claim 5 further comprising said valve member having a portion thereof that extends out through an aperture of the housing to enable the valve member to be gripped and rotated.

10. The adjustable length cylinder assembly of claim 9 further comprising splined connection acting between the piston and the valve member so that rotation of the rotary valve will rotate the piston therewith.

11. The adjustable length cylinder assembly of claim 5 further comprising said rotary valve being of hollow cylindrical shape and the accumulator having an accumulator chamber, a spring and a piston that are housed within the hollow piston, and a splined connection acts between the piston and the rotary valve so that the piston can be gripped and rotated to rotate the rotary valve member.

12. The adjustable length cylinder assembly of claim 5 further comprising said rotary valve being of hollow cylindrical shape and the piston being slidable on the inside of the hollow rotary valve, and the accumulator including an accumulator chamber that is located outboard of the rotary valve and defined at least in part by the rotary valve, and an accumulator piston that is slidable on the outside of the rotary valve within the accumulator chamber.

13. The adjustable length cylinder assembly of claim 12 further comprising said valve member having a portion thereof that extends out through an aperture of the housing to enable the valve member to be gripped and rotated.

14. The adjustable length cylinder assembly of claim 13 further comprising a splined connection acting between the piston and the valve member so that rotation of the rotary valve will rotate the piston therewith.

15. The adjustable length cylinder assembly of claim 5 further comprising a detent mechanism for establishing the rotary valve in either a first rotary position in which the channels are open or a second rotary position in which the channels are closed.

16. The adjustable length cylinder assembly of claim 5 further comprising said valve being of hollow cylindrical shape with an inner bore and one of the piston and accumulator piston is slidable within the inner bore of the rotary valve

17. The adjustable length cylinder of claim 5 further comprising said piston being of cylindrical shape and having flat surfaces provided thereon to facilitate gripping of the piston.

18. The adjustable length cylinder of claim 5 further comprising said rotary valve being of cylindrical shape and having flat surfaces provided thereon to facilitate gripping of the rotary valve.

19. The adjustable length cylinder of claim 5 further comprising said rotary valve being captured by the housing for rotary movement.

* * * * *